Figure 1:
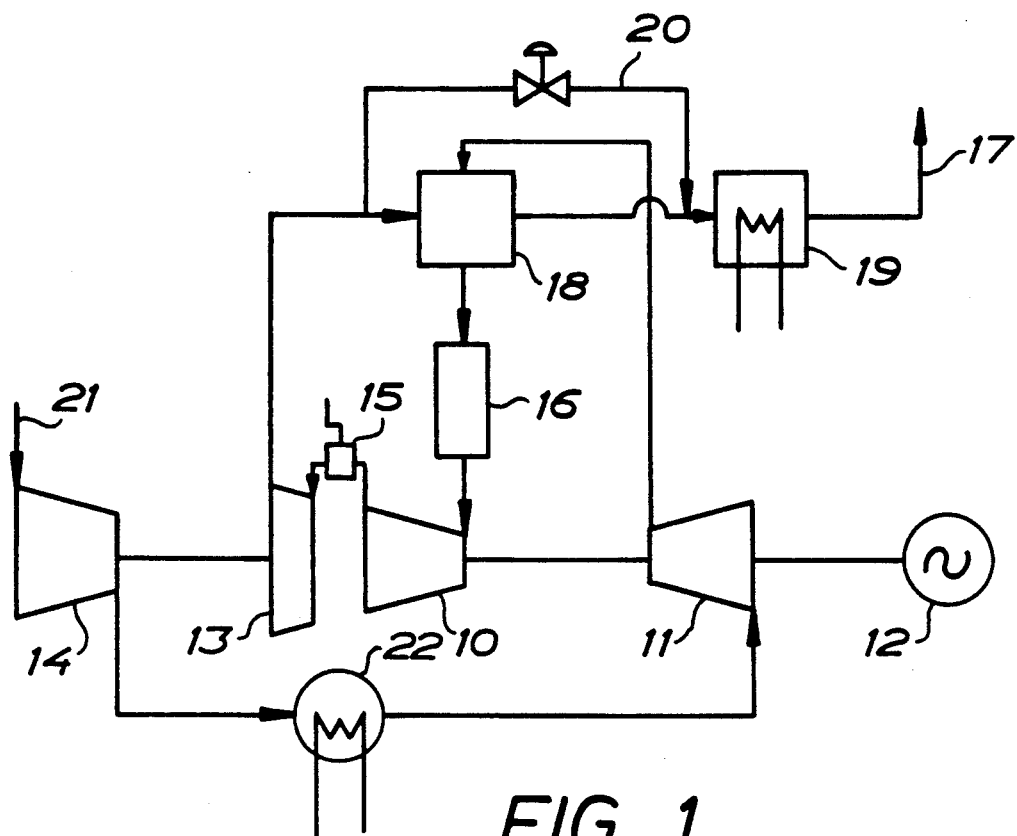

United States Patent [19]

Harboe et al.

[11] Patent Number: 5,193,337
[45] Date of Patent: Mar. 16, 1993

[54] METHOD FOR OPERATING GAS TURBINE UNIT FOR COMBINED PRODUCTION OF ELECTRICITY AND HEAT

[75] Inventors: Henrik Harboe, Copenhagen, Denmark; Ben Kyrklund, Finspång, Sweden

[73] Assignee: ABB STAL AB, Finspång, Sweden

[21] Appl. No.: 821,006

[22] Filed: Jan. 15, 1992

Related U.S. Application Data

[63] Continuation of Ser. No. 471,658, Jan. 23, 1990, abandoned.

[51] Int. Cl.⁵ .............................. F02C 3/30; F02C 7/10
[52] U.S. Cl. .................................. 60/39.03; 60/39.05; 60/39.25; 60/39.511
[58] Field of Search .................. 60/39.03, 39.04, 39.05, 60/39.07, 39.161, 39.181, 39.182, 39.2, 39.25, 39.511, 39.53

[56] References Cited

U.S. PATENT DOCUMENTS 2,095,991 10/1937 Lysholm .
3,038,308 6/1962 Fuller .
3,335,565 8/1967 Aguet .
3,796,045 3/1974 Foster-Pegg .
4,132,064 1/1979 Kumm .
4,893,466 1/1990 Egnell et al. .

FOREIGN PATENT DOCUMENTS 150990 8/1985 European Pat. Off. .
247984 12/1987 European Pat. Off. .
1526897 11/1966 Fed. Rep. of Germany .
124253 1/1972 France .
836135 6/1960 United Kingdom .
094404 9/1982 United Kingdom .
133839 8/1984 United Kingdom .

Primary Examiner—Louis J. Casaregola
Attorney, Agent, or Firm—Merchant, Gould, Smith, Edell, Welter & Schmidt

[57] ABSTRACT

Gas turbine unit comprising a high pressure turbine (10) driving a high pressure compressor (11), and a low pressure turbine (13) driving a low pressure compressor (14) and a generator (12), a combustion chamber supplying gas to the compressors, and a recuperator (18) for heat exchange between exhaust gas and compressor air, the low pressure turbine having an adjustable geometry and an adjustable connection (20) being provided bypassing the recuperator, and a method in operating the gas turbine unit wherein the electrical power is adjusted to a desired value by changing the geometry of the low pressure turbine and the heat power is adjusted by adjusting the bypass flow to a desired value.

3 Claims, 2 Drawing Sheets

METHOD FOR OPERATING GAS TURBINE UNIT FOR COMBINED PRODUCTION OF ELECTRICITY AND HEAT

This is a continuation of application Her. No. 07/471,658, filed Jan. 23, 1990 (abandoned).

The invention relates to a method of operating a gas turbine unit for combined production of electricity and heat.

A gas turbine unit for combined production of electricity and heat such as hot water for remote heating networks is required to fulfill the following demands:
high electrical efficiency
high total thermal efficiency
high relationship electricity to heat
flexibility between electricity and heat production
insensitive to variations of the surrounding temperature.

These demands are fulfilled very well by a two-shaft gas turbine unit of the type comprising a combustion chamber, a high pressure turbine driven by gas from the combustion chamber, a low pressure turbine driven by the exhaust gas from the high pressure turbine, a low pressure compressor driven by the low pressure turbine, a high pressure compressor connected in series with the low pressure compressor and driven by the high pressure turbine for the supply of pressurized air to the combustion chamber, a generator driven by the high pressure turbine for producing electricity, a recuperator for heat exchange between exhaust gas and pressurized air from the compressors, an intermediate cooler for producing hot water between the low pressure and high pressure compressors, and an exhaust gas heat exchanger for producing hot water.

Electricity is produced by the generator connected to the shaft of the high pressure turbine, hot water at a temperature ranging from 70° to 120° C. being produced in the intermediate cooler and the exhaust gas heat exchanger. The shaft of the high pressure turbine thus rotates at a constant speed, the shaft of the low pressure turbine being allowed to rotate freely.

Considering the thermodynamic process in the gas turbine unit referred to such a unit shortly can be defined as a "recuperative exhaust gas turbine having an intermediate cooler" and has an electrical efficiency which is 30 to 40% better than that of a simple gas turbine operating at a corresponding turbine inlet temperature. Since the heat recovered in the intermediate cooler, and the heat of the exhaust gas is utilized for the hot water production a high total efficiency will be obtained.

The invention relates to a method of operating a gas turbine unite of the type referred to above, and in order to satisfy the remaining demands listed above the invention provides a method comprising the steps of adjusting the electric power to the desired value by changing the geometry of the low pressure turbine in order to change the rotational speed thereof at constant temperature in the combustion chamber, and adjusting the heat power to the desired value by controlling a flow bypassing the recuperator.

The invention also provides a gas turbine unit of the type referred to which can be used in working the method of the invention, wherein the low pressure turbine has an adjustable geometry and wherein an adjustable connection is provided bypassing the recuperator.

Figure 2:
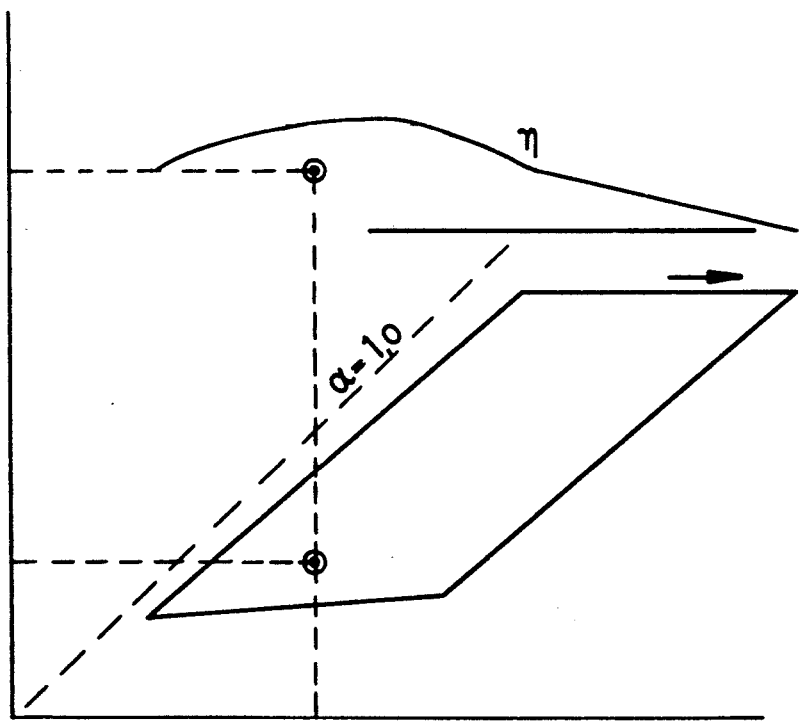
Figure 3:
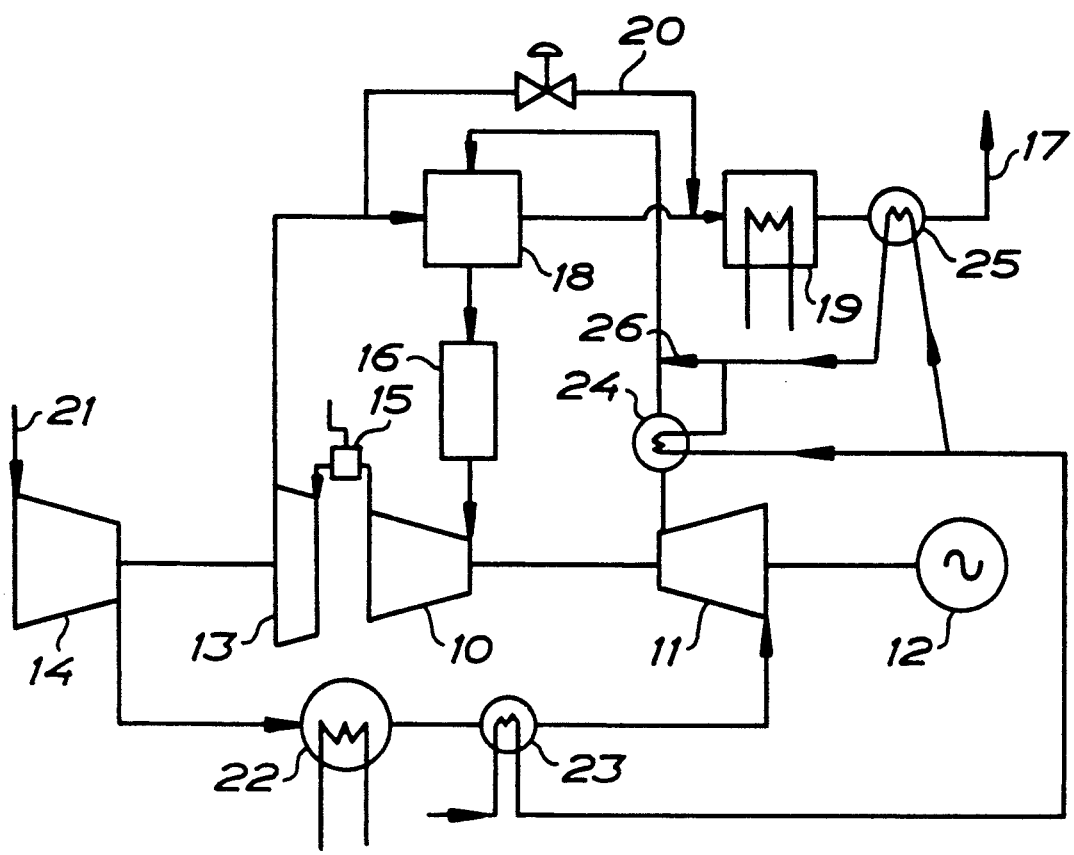

In order to explain the invention in more detail reference is made to the accompanying drawings in which FIG. 1 is a diagram of a gas turbine unit for working the method of the invention, FIG. 2 is a graph disclosing the operative range of the gas turbine unit, and FIG. 3 is a diagram of the gas turbine unit having supplementary apparatus for water injection.

Referring to FIG. 1 the turbine unit disclosed therein comprises a high pressure gas turbine 10 which is connected to a high pressure compressor 11 and, via a gearing, to an electric generator 12 for recovering electric useful output from the unit, and a low pressure gas turbine 13 which is connected to a low pressure compressor 14. Between the high pressure turbine and the low pressure turbine a regulator 15 is provided for adjustable low pressure turbine geometry.

A combustion chamber 16 (boiler) is connected at the gas outlet thereof to the high pressure turbine to supply gas to said turbine as well as the low pressure turbine connected in series with the high pressure turbine. The low pressure turbine is connected to a chimney as indicated by an arrow 17 in series with a recuperator 18 and an exhaust gas heat exchanger 19. The combustion chamber is connected at the air inlet thereof to the high pressure compressor to supply combustion air via the recuperator. An adjustable connection 20 bypassing the recuperator 18 is provided to pass part of the exhaust gas flow past the recuperator.

The high pressure compressor is connected in series with the low pressure compressor which takes air from the surroundings as indicated by an arrow 21. An intermediate cooler (intercooler) 22 is provided in the connection between the low pressure compressor and the high pressure compressor for heat exchange between the air in the compressor circuit and an external circuit for producing hot water, and the exhaust gas heat exchanger is provided for the same purpose.

In the method of the invention the air flow is controlled primarily, the temperature level being maintained constant, by the rotational speed of the low pressure compressor being adjusted by means of the regulator 15 in order to change the geometry of the low pressure turbine. Not until this control possibility has been fully utilized control of the temperature in the combustion chamber will be initiated. When this control method is applied the efficiency will be as good as or even better than that in the full load position within nearly the total partial load range (10 to 100% load). Due to the fact that part of the exhaust gas flow is passed through the adjustable connection 20 bypassing the recuperator the heat flow to the exhaust gas heat exchanger 19 will be increased. Then, the electricity production will be reduced at constant supply of fuel due to the reduced preheating of the combustion air. The gas turbine unit as a consequence thereof can operate within a large range of varying electricity to heat relationships as is illustrated in FIG. 2. The electric efficiency will decrease at increasing bypass relationship while the total efficiency will increase.

A conventional gas turbine is sensitive to the surrounding temperature. The output and the electrical efficiency will decrease at increasing surrounding temperature due to decreasing inlet air mass flow. In the gas turbine unit described herein the rotational speed of the low pressure turbine can be adjusted by means of the regulator 15 in order to change the geometry of the low pressure turbine such that the mass flow of the air will be maintained at a constant value at varying surrounding temperature.

The amount of nitrogen oxides (NO$_x$) of the exhaust gas can be reduced to low levels by water injection into the combustion chamber in the manner applied in conventional gas turbines. Then there is usually obtained an increased electric power and a decreased electrical and total efficiency. However, in the gas turbine unit described herein the electric power and the electrical efficiency can be increased by water injection by using the supplementary apparatus shown in FIG. 3. Water for the water injection is preheated by means of the compressor air in heat exchangers 23 and 24 and/or by means of the exhaust gas in a heat exchanger 25 as is shown in FIG. 3 then to be injected into the compressor air upstream the recuperator 18 at 26. Then, the heat absorption in the recuperator will be increased providing an improved electrical efficiency. However, the total efficiency will decrease due to increased chimney loss.

We claim:

1. Method in operating a gas turbine unit for combined production of electricity and heat comprising a combustion chamber, a high pressure turbine driven by gas from the combustion chamber, a low pressure turbine driven by the exhaust gas from the high pressure turbine, a low pressure compressor driven by the low pressure turbine, a high pressure compressor connected in series with the low pressure compressor and driven by the high pressure turbine for the supply of pressurized air to the combustion chamber, a generator driven by the high pressure turbine for producing electricity, a recuperator for heat exchange between exhaust gas and pressurized air from the compressors, an intermediate cooler for producing hot water between the low pressure and high pressure compressors and an exhaust gas heat exchanger for producing hot water, the method comprising the steps of adjusting the electric power to the desired value by changing the geometry of the low pressure turbine in order to change the rotational speed thereof while maintaining a constant temperature in the combustion chamber, adjusting the heat power to the desired value by controlling a flow bypassing the recuperator, and injecting water into the compressor air upstream the recuperator.

2. Method as in claim 1 further comprising the step of preheating the injection water.

3. Method in operating a gas turbine unit for combined production of electricity and heat comprising a combustion chamber, a high pressure turbine driven by gas from the combustion chamber, a low pressure turbine driven by the exhaust gas from the high pressure turbine, a low pressure compressor driven by the low pressure turbine, a high pressure compressor connected in series with the low pressure compressor and driven by the high pressure turbine for the supply of pressurized air to the combustion chamber, a generator driven by the high pressure turbine for producing electricity, a recuperator for heat exchange between exhaust gas and pressurized air from the compressors, and intermediate cooler for producing hot water between the low pressure and high pressure compressors and an exhaust gas heat exchanger for producing hot water, the method comprising the steps of adjusting the water temperature produced in the recuperator to a desired level while maintaining a constant temperature in the combustion chamber, by adjusting the rotational speed of the low pressure turbine by changing the geometry of said turbine and by controlling the percentage of bypassing the recuperator.

* * * * *